US009496126B2

(12) United States Patent
Smith

(10) Patent No.: US 9,496,126 B2
(45) Date of Patent: Nov. 15, 2016

(54) SYSTEMS AND METHODS FOR IMPROVED ROBUSTNESS FOR QUADRUPOLE MASS SPECTROMETRY

(71) Applicant: Thermo Finnigan LLC, San Jose, CA (US)

(72) Inventor: Johnathan Wayne Smith, San Jose, CA (US)

(73) Assignee: Thermo Finnigan LLC, San Jose, CA (US)

( * ) Notice: Subject to any disclaimer, the term of this patent is extended or adjusted under 35 U.S.C. 154(b) by 0 days.

(21) Appl. No.: 14/690,307

(22) Filed: Apr. 17, 2015

(65) Prior Publication Data

US 2016/0307745 A1 Oct. 20, 2016

(51) Int. Cl.
*H01J 49/32* (2006.01)
*H01J 47/06* (2006.01)
(Continued)

(52) U.S. Cl.
CPC ........ *H01J 49/4215* (2013.01); *H01J 49/0036* (2013.01)

(58) Field of Classification Search
CPC ............... H01J 49/025; H01J 49/0031; H01J 49/0036; H01J 49/26; H01J 49/42; H01J 49/421; H01J 49/4215; H01J 49/32; H01J 49/107; H01J 49/0095; H01J 49/06; H01J 49/40; H01J 49/48; H01J 37/244; G01N 27/622; G01N 30/7206; G01N 30/8624; G01N 30/8631; G01N 30/8679
USPC ................ 250/282, 397, 281, 287, 288, 299
See application file for complete search history.

(56) References Cited

U.S. PATENT DOCUMENTS 4,810,882 A * 3/1989 Bateman .................. G01T 1/28 250/281
5,175,430 A * 12/1992 Enke ................. G01N 30/8679 250/282

(Continued)

FOREIGN PATENT DOCUMENTS

WO WO 2004/111609 A2 12/2004
WO WO 2008/008867 A2 1/2008

(Continued)

OTHER PUBLICATIONS

Haji-Saeed, et al., "Dynamic range compression deconvolution for enhancement of automatic target recognition system performance", Proc. SPIE 6967, Automatic Target Recognition XVIII, 696706 (2008), pp. 10.1117/12.778470.

(Continued)

*Primary Examiner* — David A Vanore
(74) *Attorney, Agent, or Firm* — David A. Schell

(57) ABSTRACT

A method for analyzing a sample by mass spectrometry includes producing ions from the sample, delivering the ions to an entrance of a multipole, and applying oscillatory and resolving DC voltages to electrodes of the multipole. The oscillatory and resolving DC voltages cause the multipole to selectively transmit to its distal end ions within a range of mass-to-charge ratios (m/z's) determined by the amplitudes of the oscillatory and resolving DC voltages. The method further includes acquiring data representative of the spatial distributions of ions transmitted by the multipole at a plurality of consecutive time points, and deconvolving the acquired data to produce a mass spectrum. Deconvolving the acquired data includes processing the data to compress a dynamic range of intensity values in the data.

26 Claims, 6 Drawing Sheets

(51) Int. Cl.

| | |
|---|---|
| ***G01N 30/00*** | (2006.01) |
| ***H01J 49/42*** | (2006.01) |
| ***H01J 49/00*** | (2006.01) |

(56) References Cited

U.S. PATENT DOCUMENTS

| | | | | |
|---|---|---|---|---|
| 5,644,128 | A * | 7/1997 | Wollnik | H01J 37/244 250/251 |
| 5,719,392 | A * | 2/1998 | Franzen | G01N 27/622 250/282 |
| 6,661,013 | B2 * | 12/2003 | Jagutzki | G01T 1/17 250/385.1 |
| 7,019,307 | B1 * | 3/2006 | Gribb | G01T 1/2957 250/370.05 |
| 7,339,521 | B2 * | 3/2008 | Scheidemann | H01J 49/107 342/179 |
| 7,470,901 | B2 * | 12/2008 | Page | H01J 49/48 250/261 |
| 8,841,610 | B2 * | 9/2014 | Schoen | H01J 49/26 250/282 |
| 9,214,322 | B2 * | 12/2015 | Kholomeev | H01J 43/00 |
| 2011/0054804 | A1 | 3/2011 | Pfaff | |
| 2011/0215235 | A1 | 9/2011 | Schoen et al. | |
| 2014/0097329 | A1 * | 4/2014 | Wadsworth | G01J 1/46 250/208.1 |
| 2014/0224980 | A1 * | 8/2014 | Schoen | H01J 49/26 250/283 |

FOREIGN PATENT DOCUMENTS

| | | | |
|---|---|---|---|
| WO | WO 2009/048739 | A2 | 4/2009 |
| WO | WO 2014/176316 | A2 | 10/2014 |

OTHER PUBLICATIONS

Haji-Saeed, et al., "Nonlinear dynamic range compression deconvolution", Opt Lett 2006 (13), pp. 1969-1971.

Haji-Saeed, et al., "Spectrally variable two-beam coupling nonlinear deconvolution", Appl Opt 2007 (34), pp. 8244-8249.

* cited by examiner

SYSTEMS AND METHODS FOR IMPROVED ROBUSTNESS FOR QUADRUPOLE MASS SPECTROMETRY

FIELD

The present disclosure generally relates to the field of mass spectrometry including systems and methods for improved robustness for quadrupole mass spectrometry.

INTRODUCTION

Quadrupoles are conventionally described as low resolution instruments. The theory and operation of conventional quadrupole mass spectrometers is described in numerous text books (e.g., Dawson P. H. (1976), Quadrupole Mass Spectrometry and Its Applications, Elsevier, Amsterdam), and in numerous Patents, such as, U.S. Pat. No. 2,939,952, entitled "Apparatus For Separating Charged Particles Of Different Specific Charges," to Paul et al, filed Dec. 21, 1954, issued Jun. 7, 1960.

As a mass filter, such instruments operate by setting stability limits via applied RF and DC potentials that are capable of being ramped as a function of time such that ions with a specific range of mass-to-charge ratios have stable trajectories throughout the device. In particular, by applying fixed and/or ramped AC and DC voltages to configured cylindrical but more often hyperbolic electrode rod pairs in a manner known to those skilled in the art, desired electrical fields are set-up to stabilize the motion of predetermined ions in the x and y dimensions. As a result, the applied electrical field in the x-axis stabilizes the trajectory of heavier ions, whereas the lighter ions have unstable trajectories. By contrast, the electrical field in the y-axis stabilizes the trajectories of lighter ions, whereas the heavier ions have unstable trajectories. The range of masses that have stable trajectories in the quadrupole and thus arrive at a detector placed at the exit cross section of the quadrupole rod set is defined by the mass stability limits.

Typically, quadrupole mass spectrometry systems employ a single detector to record the arrival of ions at the exit cross section of the quadrupole rod set as a function of time. By varying the mass stability limits monotonically in time, the mass-to-charge ratio of an ion can be (approximately) determined from its arrival time at the detector. In a conventional quadrupole mass spectrometer, the uncertainty in estimating of the mass-to-charge ratio from its arrival time corresponds to the width between the mass stability limits. This uncertainty can be reduced by narrowing the mass stability limits, i.e. operating the quadrupole as a narrow-band filter. In this mode, the mass resolving power of the quadrupole is enhanced as ions outside the narrow band of "stable" masses crash into the rods rather than passing through to the detector. However, the improved mass resolving power comes at the expense of sensitivity. In particular, when the stability limits are narrow, even "stable" masses are only marginally stable, and thus, only a relatively small fraction of these reach the detector.

Background information for a mass spectrometer system that provides for temporal and spatial detection of ions, is described and claimed in, U.S. Pub. No. 2011/0215235, entitled, "QUADRUPOLE MASS SPECTROMETER WITH ENHANCED SENSITIVITY AND MASS RESOLVING POWER," published Sep. 8, 2011, to Schoen et al., (incorporated herein in its entirety) including the following, "[t]he present invention is directed to a novel quadrupole mass filter method and system that discriminates among ion species, even when both are simultaneously stable, by recording where the ions strike a position-sensitive detector as a function of the applied RF and DC fields. When the arrival times and positions are binned, the data can be thought of as a series of ion images. Each observed ion image is essentially the superposition of component images, one for each distinct m/z value exiting the quadrupole at a given time instant. Because the present invention provides for the prediction of an arbitrary ion image as a function of m/z and the applied field, each individual component can be extracted from a sequence of observed ion images by the mathematical deconvolution processes discussed herein. The mass-to-charge ratio and abundance of each species necessarily follow directly from the deconvolution."

Accordingly, there is a need in the field of mass spectrometry to improve the mass resolving power of such systems without the loss in signal-to-noise ratio (i.e., sensitivity).

SUMMARY

In a first aspect, a method for analyzing a sample by mass spectrometry can include producing ions from the sample and delivering the ions to an entrance of a multipole; applying oscillatory and resolving DC voltages to electrodes of the multipole to cause the multipole to selectively transmit to its distal end ions within a range of mass-to-charge ratios (m/z's) determined by the amplitudes of the oscillatory and resolving DC voltages; acquiring, at a detector located adjacent to the distal end of the multipole, data representative of the spatial distributions, across a plane oriented orthogonally to a longitudinal axis of the multipole, of ions transmitted by the multipole at a plurality of consecutive time points; and deconvolving the acquired data to produce a mass spectrum, wherein the deconvolving includes processing the data to compress a dynamic range of intensity values in the data.

In various embodiments of the first aspect, the method can further include deconvolving the acquired data without compressing a dynamic range of intensity values to determine a relative abundance of ions.

In various embodiments of the first aspect, the processing step can include rescaling the intensity values in accordance with a power function. In particular embodiments, the data can be organized into a plurality of voxel planes, and the processing step can include adjusting a parameter of the power function based on a total intensity of each voxel plane. In other particular embodiments, the data can be organized into a voxel set can include a plurality of voxel planes, and the processing step includes adjusting a parameter of the power function based on a total intensity of the voxel set.

In various embodiments of the first aspect, the step of deconvolving the data can include computing cross-products of the processed data with a set of reference signals, the reference signals each being representative of a measured or expected spatial distribution of a single ion species at a particular operating state of the multipole.

In various embodiments of the first aspect, the step of applying oscillatory and resolving DC voltages can include progressively varying at least one of the amplitudes of the oscillatory and resolving DC voltages during a scan period, and wherein the step of acquiring data can include acquiring data a plurality of consecutive time points extending along the scan period.

In various embodiments of the first aspect, the abundance of ions can be affected by chromatographic skew.

In various embodiments of the first aspect, the abundance of ions can be affected by source instability.

In a second aspect, a method for analyzing a sample by mass spectrometry can include providing an analyte to a mass spectrometer. The mass spectrometer can include a multipole configured to selectively transmit to its distal end ions within a range of mass-to-charge ratios (m/z's) determined by the amplitudes of oscillatory and resolving DC voltages applied to electrodes of the multipole; and a detector located adjacent to the distal end of the multipole. The method can further include acquiring, at the detector, data representative of spatial distributions, across a plane oriented orthogonally to a longitudinal axis of the multipole, of ions transmitted by the multipole at a plurality of consecutive time points; and deconvolving the acquired data to produce a mass spectrum, wherein the deconvolving includes processing the data to compress a dynamic range of intensity values in the data.

In various embodiments of the second aspect, can further include deconvolving the acquired data a second time without compressing the dynamic range of the intensity values to determine relative abundance of ions. In particular embodiments, deconvolving the second time can utilize the positional information obtained by the first deconvolving step.

In various embodiments of the second aspect, the processing step can include rescaling the intensity values in accordance with a power function. In particular embodiments, the data can be organized into a plurality of voxel planes, and the processing step can include adjusting a parameter of the power function based on a total intensity of each voxel plane. In other particular embodiments, the data can be organized into a voxel set including a plurality of voxel planes, and the processing step can include adjusting a parameter of the power function based on a total intensity of the voxel set.

In particular embodiments, the step of deconvolving the data can include computing cross-products of the processed data with a set of reference signals, the reference signals each being representative of a measured or expected spatial distribution of a single ion species at a particular operating state of the multipole.

In particular embodiments, the abundance of ions can be affected by chromatographic skew.

In particular embodiments, the abundance of ions can be affected by source instability.

In a third aspect, a mass spectrometer can include a multipole comprising a set of electrodes extending between entrance and distal ends; a voltage controller for applying oscillatory and resolving DC voltages to the set of electrodes, a position-sensitive detector located adjacent to the distal end of the multipole for acquiring data representative of the spatial distributions, across a plane oriented orthogonally to a longitudinal axis of the multipole, of ions transmitted by the multipole at a plurality of consecutive time points; and a processor programmed with instructions to deconvolve the acquired data to produce a mass spectrum, wherein the instructions include processing the data to compress a dynamic range of intensity values in the data. The applied oscillatory and resolving voltages can establish an electric field within the multipole that causes ions within a range of m/z's to be selectively transmitted from the entrance end to the distal end of the multipole, and the range of m/z's of the transmitted ions can be determined by the amplitudes of the applied oscillatory and resolving DC voltages.

In various embodiments of the third aspect, the instructions to process the data can include instructions to rescale the intensity values in accordance with a power function. In particular embodiments, the data can be organized into a plurality of voxel planes, and the instructions to process the data can include instructions to adjust a parameter of the power function based on a total intensity of each voxel plane. In particular embodiments, the data can be organized into a voxel set including a plurality of voxel planes, and the instructions to process the data can include instructions to adjust a parameter of the power function based on a total intensity of the voxel set.

In various embodiments of the third aspect, the instructions to deconvolve the data can include instructions to compute cross-products of the processed data with a set of reference signals, the reference signals can be representative of a measured or expected spatial distribution of a single ion species at a particular operating state of the multipole.

In various embodiments of the third aspect, the voltage controller can be configured to progressively vary at least one of the amplitudes of the oscillatory and resolving DC voltages during a scan period, and wherein the acquired data can include data from a plurality of consecutive time points extending along the scan period.

In various embodiments of the third aspect, the abundance of ions can be affected by chromatographic skew.

In various embodiments of the third aspect, the abundance of ions can be affected by source instability.

DRAWINGS

For a more complete understanding of the principles disclosed herein, and the advantages thereof, reference is now made to the following descriptions taken in conjunction with the accompanying drawings, in which:

FIGS. 1A, 1B, and 1C are diagrams illustrating various peak anomalies, in accordance with various embodiments.

Figure 1A:
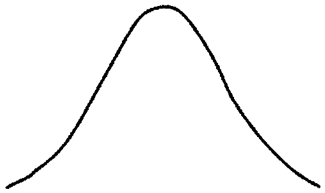

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DESCRIPTION OF VARIOUS EMBODIMENTS

Embodiments of systems and methods for improved robustness for quadrupole mass spectrometry are described herein.

The section headings used herein are for organizational purposes only and are not to be construed as limiting the described subject matter in any way.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless described otherwise, all technical and scientific terms used herein have a meaning as is commonly understood by one of ordinary skill in the art to which the various embodiments described herein belongs.

It will be appreciated that there is an implied "about" prior to the temperatures, concentrations, times, etc. discussed in the present teachings, such that slight and insubstantial deviations are within the scope of the present teachings. In this application, the use of the singular includes the plural unless specifically stated otherwise. Also, the use of "comprise", "comprises", "comprising", "contain", "contains", "containing", "include", "includes", and "including" are not intended to be limiting. It is to be understood that both the foregoing general description and the following detailed description are exemplary and explanatory only and are not restrictive of the present teachings.

As used herein, "a" or "an" also may refer to "at least one" or "one or more." Also, the use of "or" is inclusive, such that the phrase "A or B" is true when "A" is true, "B" is true, or both "A" and "B" are true. Further, unless otherwise required by context, singular terms shall include pluralities and plural terms shall include the singular.

A "system" sets forth a set of components, real or abstract, comprising a whole where each component interacts with or is related to at least one other component within the whole.

FIG. 1A illustrates an exemplary curve representative of an intensity peak observed in a mass spectrum.

Figure 1B:

FIG. 1B illustrates an exemplary curve subject to chromatographic skew. When used in conjunction with a gas chromatograph or a liquid chromatograph, the concentration of the analyte over time from the chromatograph can lead to a distortion of the distribution of the ion intensity when observed over a time period where the concentration from the chromatograph is subject to a significant rise or fall.

Figure 1C:
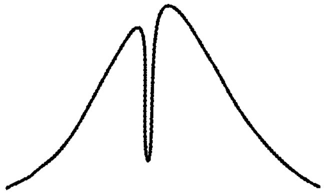

FIG. 1C illustrates an exemplary curve subject to source instability. In various embodiments, an ion source of a mass spectrometer can experience periodic instability where the supply of ions produced by the source drops significantly for a brief period of time. When observing the distribution of ions of an analyte over time, the instability of the source can cause sharp downward spikes in the observed curve.

Figure 2:
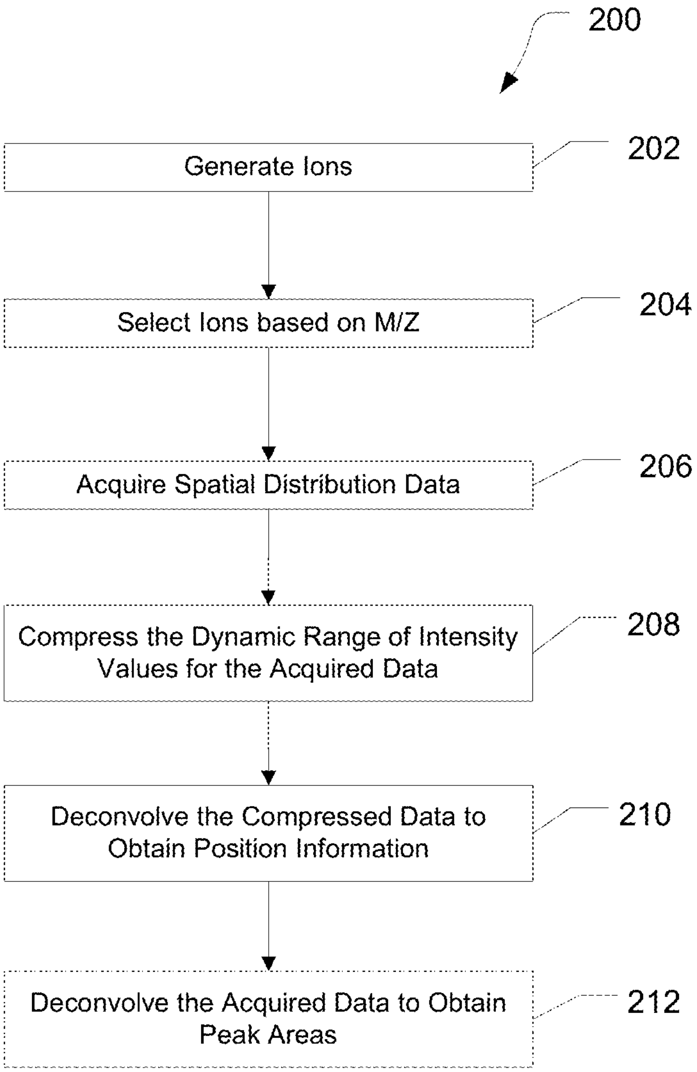
FIG. 2 is a flow diagram of an exemplary method for analyzing properties of ions, in accordance with various embodiments.

FIG. 2 is a flow diagram illustrating an exemplary method 200 for analyzing the mass of ions. At 202, ions can be generated from a sample. In various embodiment's, the ions can be generated by matrix assisted laser desorption/ionization (MALDI), electrospray ionization (ESI), inductively coupled plasma (ICP), electron ionization, photoionization, glow discharge ionization, thermospray ionization, and the like. In various embodiments, the ions can be delivered to an entrance of a multipole.

At 204, ions can be selected based on their mass to charge (m/z) ratio. In various embodiments, a multipole, such as a quadrupole mass filter, can be used to pass ions of a selected range of m/z ratio. Oscillatory and resolving DC voltages can be applied to electrodes of the multipole to cause the selective transmission of ions to a distal end within a range of mass-to-charge ratios determined by amplitudes of the oscillatory and resolving DC voltages. The passed ions may be sent to a detector without further alteration, or in a MS-MS experiment, the ions may be directed to a collision cell where they can be fragmented through collisions with atoms or molecules of a collision gas. Another multipole can be used to select fragment ions having a m/z ratio within a selected range in a similar manor to that described above.

At 206, the spatial distribution data can be acquired. The data can be representative of the spatial distributions of ions across a plane oriented orthogonally to a longitudinal axis of the multipole. The data can be acquired by a detector located adjacent to the distal end of the multipole. Data can be recorded for ions transmitted by the multipole at a plurality of consecutive time points such that the arrival time and location of ions reaching the detector can be recorded. The intensity measured by the detector can correlate the number of ions reaching the detector at a particular arrival time interval and location.

In various embodiments, at least one of the amplitudes of the oscillatory and resolving DC voltages can be progressively varied during a scan period. Further, the spatial distribution data can be acquired at consecutive time points extending along the scan period, and the spatially acquired data can be correlated with varying oscillatory and resolving DC voltages.

At 208, the intensity range of the spatial distribution data can be compressed. In various embodiments, a power function can be applied to the intensities of the spatial and temporal properties to compress the intensity range. In various embodiments, a parameter of the power function can be adjusted based on a total intensity, such as determined by summing the intensities in a voxel plane (a two dimensional plane of the spatial and temporal properties, such as the spatial intensities (x,y plane) at a fixed time) or in a voxel set (a three dimensional data set including x and y spatial dimensions and a temporal dimension).

At 210, the intensity compressed spatial distribution data can be deconvolved to obtain position information of the intensity peaks corresponding to masses of ions. In various embodiments, the intensities of the peaks can be recovered by decompressing using the power function. In various embodiments, deconvolving can include computing cross-products of the processed data with a set of reference signals. The reference signals can be representative of a measured of expected spatial distribution of a single ion species at a particular operating state of the multipole.

Optionally, at 212, the acquired spatial distribution data can be deconvolved without compression using the location information determined at 210 to limit the deconvolution. The intensities of the peaks identified in this way can be more accurate than when decompressing the deconvolved intensity compressed data.

Figure 3:
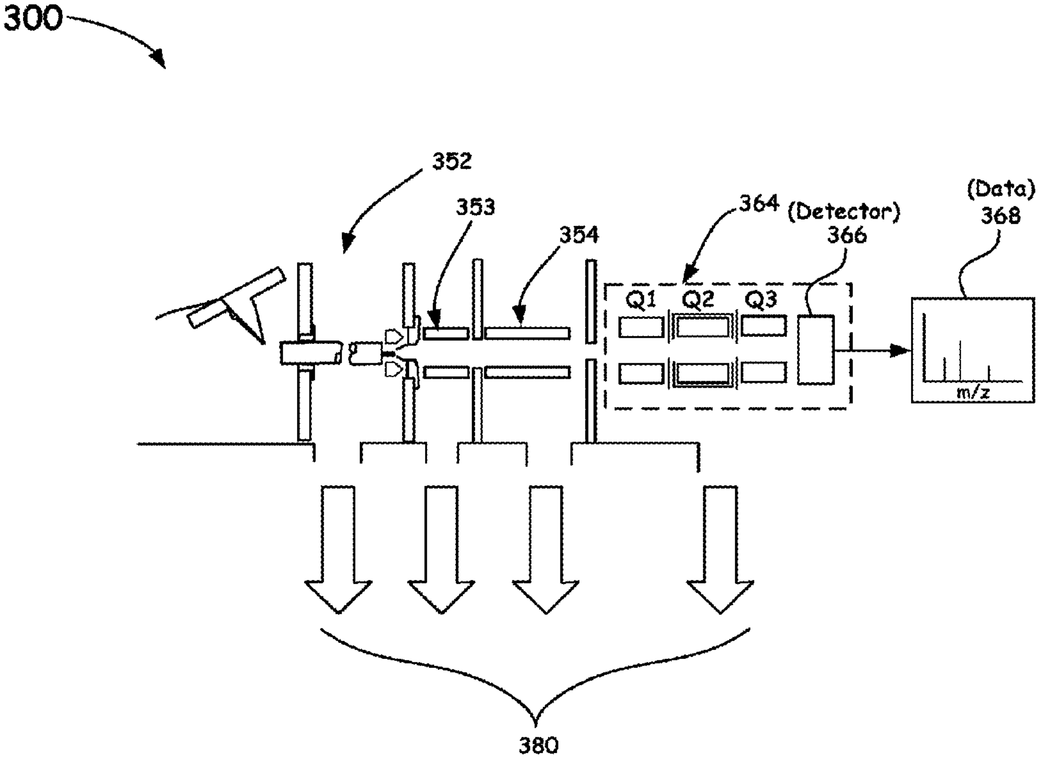
FIG. 3 is a diagram illustrating an exemplary mass spectrometer, in accordance with various embodiments.

FIG. 3 shows a beneficial example configuration of a triple stage mass spectrometer system (e.g., a commercial TSQ), as shown generally designated by the reference numeral 300. It is to be appreciated that mass spectrometer system 300 is presented by way of a non-limiting beneficial example and thus the present invention may also be practiced in connection with other mass spectrometer systems having architectures and configurations different from those depicted herein.

The operation of mass spectrometer 300 can be controlled and data can be acquired by a control and data system (not depicted) of various circuitry of a known type, which may be implemented as any one or a combination of general or special-purpose processors (digital signal processor (DSP)), firmware, software to provide instrument control and data analysis for mass spectrometers and/or related instruments, and hardware circuitry configured to execute a set of instructions that embody the prescribed data analysis and control routines of the present invention. Such processing of the data may also include averaging, scan grouping, deconvolution as disclosed herein, library searches, data storage, and data reporting.

Turning back to the example mass spectrometer 300 system of FIG. 3, a sample containing one or more analytes of interest can be ionized via an ion source 352 operating at or near invention can be operated either in the radio frequency (RF)-only mode or an RF/DC mode. Depending upon the particular applied RF and DC potentials, only ions of selected charge to mass ratios are allowed to pass through such structures with the remaining ions following unstable trajectories leading to escape from the applied multipole field. When only an RF voltage is applied between predetermined electrodes (e.g., spherical, hyperbolic, flat electrode pairs, etc.), the apparatus can be operated to transmit ions in a wide-open fashion above some threshold mass. When a combination of RF and DC voltages is applied between predetermined rod pairs there can be both an upper cutoff mass as well as a lower cutoff mass. As the ratio of DC to RF voltage increases, the transmission band of ion masses can be narrowed so as to provide for mass filter operation, as known and as understood by those skilled in the art.

Accordingly, the RF and DC voltages applied to predetermined opposing electrodes of the multipole devices of the present invention, as shown in FIG. 3 (e.g., Q3), can be applied in a manner to provide for a predetermined stability transmission window designed to enable a larger transmission of ions to be directed through the instrument, collected at the exit aperture and processed so as to determined mass characteristics.

An example multipole, e.g., Q3 of FIG. 3, can thus be configured along with the collaborative components of a system 300 to provide a mass resolving power of potentially up to about 1 million as opposed to when utilizing typical quadrupole scanning techniques. In particular, the RF and DC voltages of such devices can be scanned over time to interrogate stability transmission windows over predetermined m/z values (e.g., 20 AMU). Thereafter, the ions having a stable trajectory can reach a detector 366 capable of time resolution on the order of tens of RF cycles to sub RF cycle resolution. Accordingly, the ion source 352 can include, but is not strictly limited to, an Electron Ionization (EI) source, a Chemical Ionization (CI) source, a Matrix-Assisted Laser Desorption Ionization (MALDI) source, an Electrospray Ionization (ESI) source, an Atmospheric Pressure Chemical Ionization (APCI) source, a Nanoelectrospray Ionization (NanoESI) source, and an Atmospheric Pressure Ionization (API), etc.

The resultant ions can be directed via predetermined ion optics that often can include tube lenses, skimmers, and multipoles, e.g., reference characters 353 and 354, selected from radio-frequency RF quadrupole and octopole ion guides, etc., so as to be urged through a series of chambers of progressively reduced pressure that operationally guide and focus such ions to provide good transmission efficiencies. The various chambers can communicate with corresponding ports 380 (represented as arrows in the figure) that are coupled to a set of pumps (not shown) to maintain the pressures at the desired values.

The example spectrometer 300 of FIG. 3 is shown illustrated to include a triple stage configuration 364 having sections labeled Q1, Q2 and Q3 electrically coupled to respective power supplies (not shown) so as to perform as a quadrupole ion guide that can also be operated under the presence of higher order multipole fields (e.g., an octopole field) as known to those of ordinary skill in the art. It is to be noted that such pole structures of the present more, more often down to an RF cycle or with sub RF cycles specificity, wherein the specificity can be chosen to provide appropriate resolution relative to the scan rate to provide desired mass differentiation (PPM). Such a detector is beneficially placed at the channel exit of the quadrupole (e.g., Q3 of FIG. 3) to provide data that can be deconvoluted into a rich mass spectrum 368. The time-dependent data resulting from such an operation can be converted into a mass spectrum by applying deconvolution methods described herein that convert the collection of recorded ion arrival times and positions into a set of m/z values and relative abundances.

A simplistic configuration to observe such varying characteristics with time can be in the form of a narrow means (e.g., a pinhole) spatially configured along a plane between the exit aperture of the quadrupole (Q3) and a respective detector 366 designed to record the allowed ion information. By way of such an arrangement, the time-dependent ion current passing through the narrow aperture can provide for a sample of the envelope at a given position in the beam cross section as a function of the ramped voltages. Importantly, because the envelope for a given m/z value and ramp voltage is approximately the same as an envelope for a slightly different m/z value and a shifted ramp voltage, the time-dependent ion currents passing through such an example narrow aperture for two ions with slightly different m/z values can also be related by a time shift, corresponding to the shift in the RF and DC voltages. The appearance of ions in the exit cross section of the quadrupole can depend upon time because the RF and DC fields can depend upon time. In particular, because the RF and DC fields are controlled by the user, and therefore known, the time-series of ion images can be beneficially modeled using the solution of the well-known Mathieu equation for an ion of arbitrary m/z.

However, while the utilization of a narrow aperture at a predetermined exit spatial position of a quadrupole device illustrates the basic idea, there can be in effect multiple narrow aperture positions at a predetermined spatial plane at the exit aperture of a quadrupole as correlated with time, each with different detail and signal intensity. To beneficially record such information, the spatial/temporal detector 366 configurations of the present invention can be in effect somewhat of a multiple pinhole array that essentially provides multiple channels of resolution to spatially record the individual shifting patterns as images that have the embedded mass content. The applied DC voltage and RF amplitude can be stepped synchronously with the RF phase to provide measurements of the ion images for arbitrary field conditions. The applied fields can determine the appearance of the image for an arbitrary ion (dependent upon its m/z value) in a way that is predictable and deterministic. By changing the applied fields, the present invention can obtain information about the entire mass range of the sample.

Figure 4:
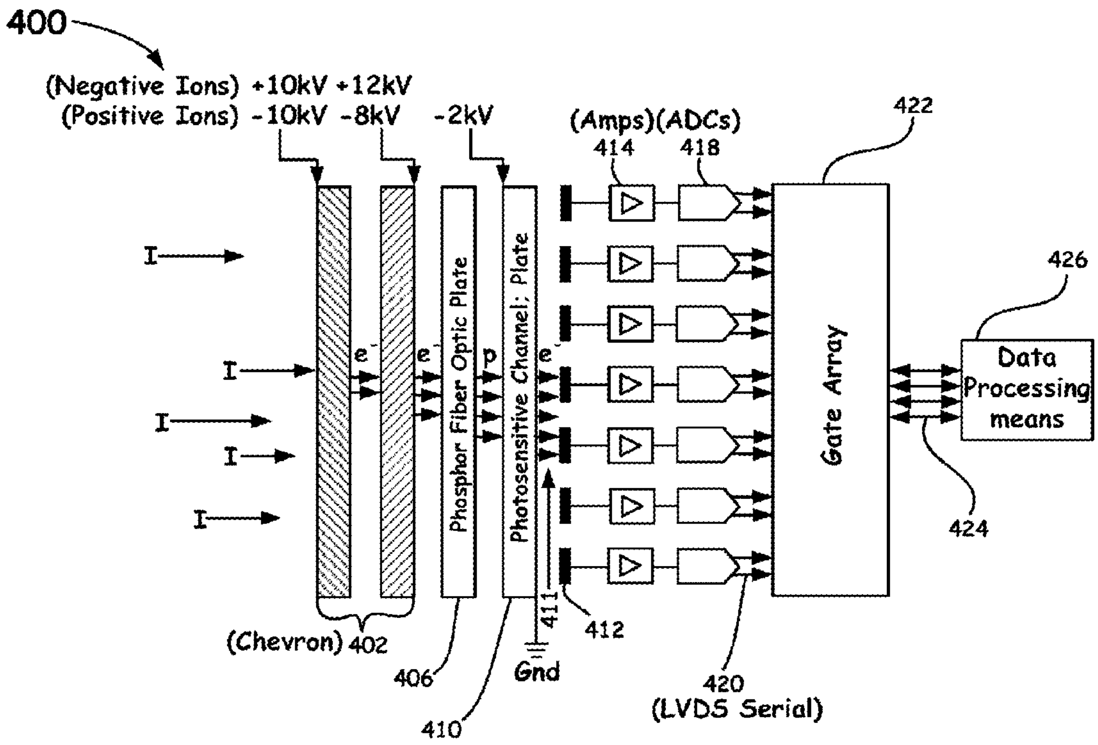
FIG. 4 is a diagram illustrating an exemplary time and position ion detector system, in accordance with various embodiments.

FIG. 4 shows a basic non-limiting beneficial example embodiment of a time and position ion detector system, generally designated by the reference numeral 400 that can be used with the methods of the present invention. As shown in FIG. 4, incoming ions I (shown directionally by way of accompanying arrows) having for example a beam diameter of at least about 1 mm, can be received by an assembly of microchannel plates (MCPs) 402. Such an assembly (e.g., for pulse counting (typically pulses of <5 nsec as known to those skilled in the art) can include a single MCP, a pair of MCPs (a Chevron or V-stack), or triple (Z-stack) MCPs adjacent to one another with each individual plate having sufficient gain and resolution to enable operating at appropriate bandwidth requirements (e.g., at about 1 MHz up to about 100 MHz) with the combination of plates generating up to about $10^7$ ormore electrons.

To illustrate operability by way of an example, the first surface of the chevron or Z-stack (MCP) 402 can be floated to 10 kV, i.e., +10 kV when configured for negative ions and −10 kV when configured to receive positive ions, with the second surface floated to +12 kV and −8 kV respectively, as shown in FIG. 4. Such a plate biasing can provide for a 2 kV voltage gradient to provide the gain with a resultant output relative 8 to 12 kV relative to ground. For a single MCP arrangement, the voltage gradient can be in a range of about 400 to about 700 V. All high voltages portions can be under vacuum between about 1 e-5 mBar and 1 e-6 mBar.

The example biasing arrangement of FIG. 4 can thus enable impinging ions I as received from, for example, the exit of a quadrupole, as discussed above, to induce electrons in the front surface of the MCP 402, that can thereafter be directed to travel along individual channels of the MCP 402 as accelerated by the applied voltages. As known to those skilled in the art, since each channel of the MCP serves as an independent electron multiplier, the input ions I as received on the channel walls produce secondary electrons (denoted as $e^-$). This process can be repeated multiple times by the potential gradient across both ends of the MCP stack 402 and a large number of electrons can in this way be released from the output end of the MCP stack 202 to substantially enable the preservation of the pattern (image) of the particles incident on the front surface of the MCP.

Returning back to FIG. 4, the biasing arrangement can also provide for the electrons multiplied by the MCP stack 402 to be further accelerated in order to strike an optical component, e.g., a phosphor coated fiber optic plate 406 configured behind the MCP stack 402. Such an arrangement can convert the signal electrons to a plurality of resultant photons (denoted as p) that are proportional to the amount of received electrons. Alternatively, an optical component, such as, for example, an aluminized phosphor screen can be provided with a biasing arrangement (not shown) such that the resultant electron cloud from the MCP 402 stack can be drawn across a gap by the high voltage onto a phosphor screen where the kinetic energy of the electrons is released as light. In any arrangement, a subsequent plate, such as, a photosensitive channel plate 410 assembly (shown with the anode output biased relative to ground) can then convert each incoming resultant photon p back into a photoelectron. Each photoelectron can generate a cloud of secondary electrons 411 at the back of the photosensitive channel plate 410, which spreads and impacts as one arrangement, an array of detection anodes 412, such as, but not limited to, an two-dimensional array of resistive structures, a two-dimensional delay line wedge and strip design, as well as a commercial or custom delay-line anode readout. As part of the design, the photosensitive channel plate 410 and the anodes 412 can be in a sealed vacuum enclosure 413 (as denoted by the dashed vertical rectangle).

As an illustrative example of a two-dimensional anode structure to comport with the designs herein, such an array can be configured as a linear X-Y grid with the anode structure often optimally configured herein to be smaller than those further from the center since almost all ion trajectories received from the exit of a quadrupole pass through the origin and thus comprise the most signal. As an illustrative arrangement, if an Arria FPGA is utilized, a target grid of 10 radial sectors and 8 radial divisions in a spider web arrangement can be desired. From such an example arrangement, the output of the anodes 412 can be configured as four symmetrical quadrants that are physically joined. If capacitance effects degrade the bandwidth of the signals, each of the anodes of FIG. 4 can be coupled to an independent amplifier 414 and additional analog to digital circuitry (ADC) 418 as known in the art. For example, such independent amplification can be by way of differential trans-impedance amplifiers to amplify and suppress noise with the ADC's 418 being provided by octal ADC's converting at less than about 500 MHz, often down to about 100 MHz, often at least about 40 MHz. If the ion entrance provided by a quadrupole is not symmetrical, then additional discrimination can be provided by an off-axis entrance orifice or by use of a cooling cell, as briefly discussed above, such as Q2 in the triple quad 364 arrangement shown in FIG. 3, so as to alter the input phase and enhance system 400 operations. In this case, joining opposite sectors is not desired.

While such an anode structure 412 shown in FIG. 4 is a beneficial embodiment, it is to also be appreciated that delay-line anodes, as stated above, of different designs (e.g., cross-wired delay-line anodes, helical grids, etc.) can also be implemented in the shown arrangement of FIG. 4, or equally arranged to be coupled adjacently following the MCP 402 stack without the additional shown components so as to also operate within the scope of the present invention. To enable the working of such devices, the structures themselves can often be coupled with appropriate additional timing and amplification circuitry (e.g., trans-impedance amplifiers) matched to the anode configurations in order to aid in converting the reading of the signal differences in arrival time into image position information. Particular beneficial cross-wired delay-line anodes that can be utilized with the systems of the present invention can be found in: U.S. Pat. No. 6,661,013, entitled "DEVICE AND METHOD FOR TWO-DIMENSIONAL DETECTION OF PARTICLES OR ELECTROMAGNETIC RADIATION," to Jagutzki et al., issued Dec. 9, 2003, the disclosure of which is hereby incorporated by reference in its entirety.

Turning back to the basic anode structure of FIG. 4, the signals resultant from amplifier 414 and analog to digital circuitry (ADC) 418 and/or charge integrators (not shown) can eventually be directed to a Field Programmable Gate Array (FPGA) 422 via, for example, a serial LVDS (low-voltage differential signaling) high-speed digital interface 420, which is a component designed for low power consumption and high noise immunity for the data rates of the present invention. An FPGA 422 can be beneficial because of the capability of being a configurable co-processor to a computer processing means 426, as shown in FIG. 4, allowing it to operate as an application-specific hardware accelerator for the computationally intensive tasks of the present invention. As one such example non-limiting arrangement, a commercial Arria FPGA having 84 in, 85 out LVDS I/O channels as well as integrated PCI express hardware 424

(denoted with four bidirectional arrows) having at least a x4 channel PCI express acquisition system, feeding a standard data processing means 426 (e.g., a computer, a PC, etc.), can be utilized with a Compute Unified Device Architecture (CUDA) parallel processing Graphics Processing Unit (GPU) subsystem.

Computer-Implemented System

Figure 5:
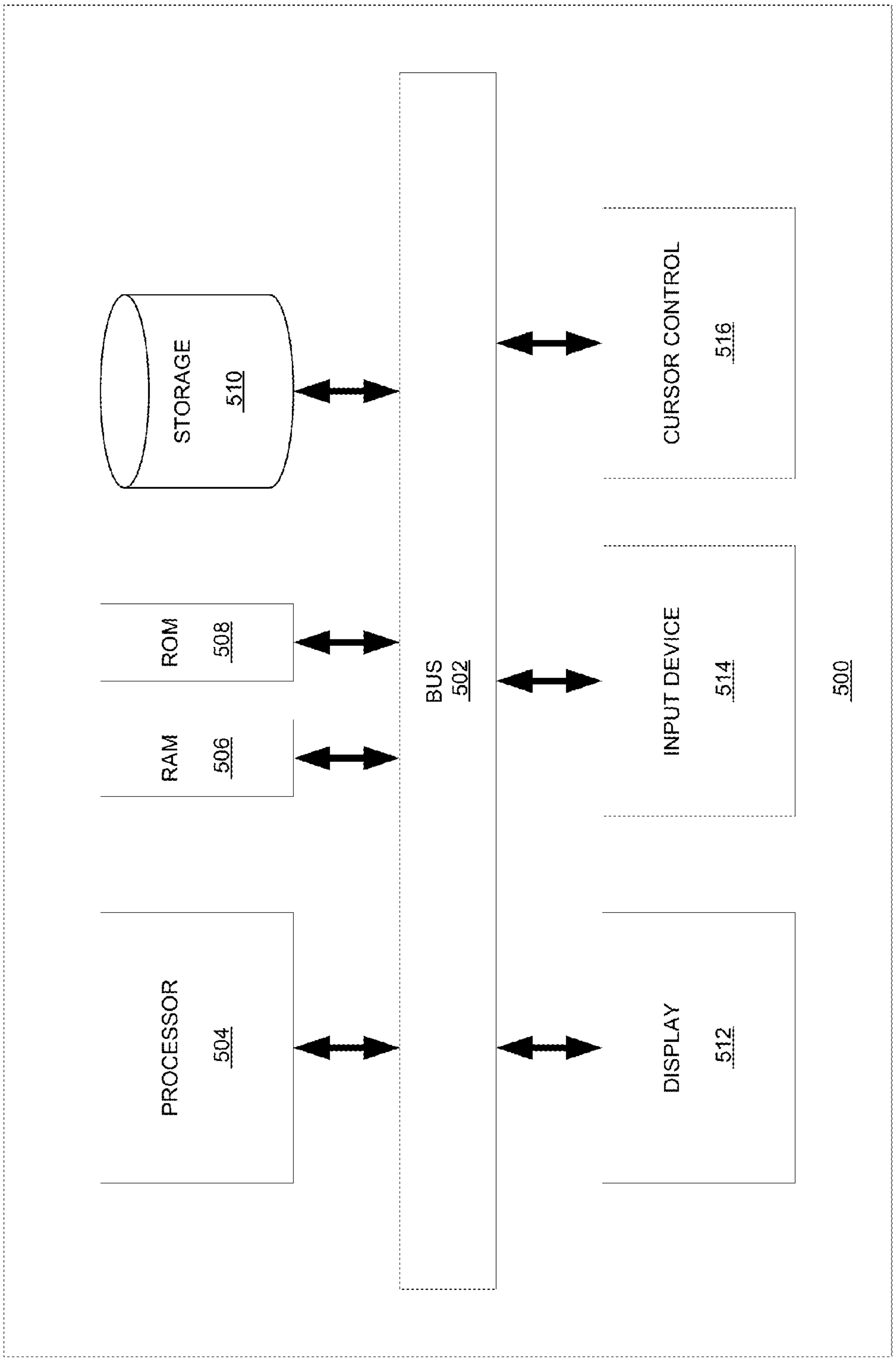
FIG. 5 is a block diagram illustrating an exemplary computer system, in accordance with various embodiments.

FIG. 5 is a block diagram that illustrates a computer system 500, upon which embodiments of the present teachings may be implemented as which may form all or part of controller 1008 of mass spectrometry platform 1000 depicted in FIG. 10. In various embodiments, computer system 500 can include a bus 502 or other communication mechanism for communicating information, and a processor 504 coupled with bus 502 for processing information. In various embodiments, computer system 500 can also include a memory 506, which can be a random access memory (RAM) or other dynamic storage device, coupled to bus 502 for determining base calls, and instructions to be executed by processor 504. Memory 506 also can be used for storing temporary variables or other intermediate information during execution of instructions to be executed by processor 504. In various embodiments, computer system 500 can further include a read only memory (ROM) 508 or other static storage device coupled to bus 502 for storing static information and instructions for processor 504. A storage device 510, such as a magnetic disk or optical disk, can be provided and coupled to bus 502 for storing information and instructions.

In various embodiments, processor 504 can include a plurality of logic gates. The logic gates can include AND gates, OR gates, NOT gates, NAND gates, NOR gates, EXOR gates, EXNOR gates, or any combination thereof. An AND gate can produce a high output only if all the inputs are high. An OR gate can produce a high output if one or more of the inputs are high. A NOT gate can produce an inverted version of the input as an output, such as outputting a high value when the input is low. A NAND (NOT-AND) gate can produce an inverted AND output, such that the output will be high if any of the inputs are low. A NOR (NOT-OR) gate can produce an inverted OR output, such that the NOR gate output is low if any of the inputs are high. An EXOR (Exclusive-OR) gate can produce a high output if either, but not both, inputs are high. An EXNOR (Exclusive-NOR) gate can produce an inverted EXOR output, such that the output is low if either, but not both, inputs are high.

TABLE 1

Logic Gates Truth Table

| INPUTS | | OUTPUTS | | | | | | |
|---|---|---|---|---|---|---|---|---|
| A | B | NOT A | AND | NAND | OR | NOR | EXOR | EXNOR |
| 0 | 0 | 1 | 0 | 1 | 0 | 1 | 0 | 1 |
| 0 | 1 | 1 | 0 | 1 | 1 | 0 | 1 | 0 |
| 1 | 0 | 0 | 0 | 1 | 1 | 0 | 1 | 0 |
| 1 | 1 | 0 | 1 | 0 | 1 | 0 | 0 | 1 |

One of skill in the art would appreciate that the logic gates can be used in various combinations to perform comparisons, arithmetic operations, and the like. Further, one of skill in the art would appreciate how to sequence the use of various combinations of logic gates to perform complex processes, such as the processes described herein.

In an example, a 1-bit binary comparison can be performed using a XNOR gate since the result is high only when the two inputs are the same. A comparison of two multi-bit values can be performed by using multiple XNOR gates to compare each pair of bits, and the combining the output of the XNOR gates using and AND gates, such that the result can be true only when each pair of bits have the same value. If any pair of bits does not have the same value, the result of the corresponding XNOR gate can be low, and the output of the AND gate receiving the low input can be low.

In another example, a 1-bit adder can be implemented using a combination of AND gates and XOR gates. Specifically, the 1-bit adder can receive three inputs, the two bits to be added (A and B) and a carry bit (Cin), and two outputs, the sum (S) and a carry out bit (Cout). The Cin bit can be set to 0 for addition of two one bit values, or can be used to couple multiple 1-bit adders together to add two multi-bit values by receiving the Cout from a lower order adder. In an exemplary embodiment, S can be implemented by applying the A and B inputs to a XOR gate, and then applying the result and Cin to another XOR gate. Cout can be implemented by applying the A and B inputs to an AND gate, the result of the A-B XOR from the SUM and the Cin to another AND, and applying the input of the AND gates to a XOR gate.

TABLE 2

1-bit Adder Truth Table

| INPUTS | | | OUTPUTS | |
|---|---|---|---|---|
| A | B | Cin | S | Cout |
| 0 | 0 | 0 | 0 | 0 |
| 1 | 0 | 0 | 0 | 1 |
| 0 | 1 | 0 | 0 | 1 |
| 1 | 1 | 0 | 1 | 0 |
| 0 | 0 | 1 | 0 | 1 |
| 1 | 0 | 1 | 1 | 0 |
| 0 | 1 | 1 | 1 | 0 |
| 1 | 1 | 1 | 1 | 1 |

In various embodiments, computer system 500 can be coupled via bus 502 to a display 512, such as a cathode ray tube (CRT) or liquid crystal display (LCD), for displaying information to a computer user. An input device 514, including alphanumeric and other keys, can be coupled to bus 502 for communicating information and command selections to processor 504. Another type of user input device is a cursor control 516, such as a mouse, a trackball or cursor direction keys for communicating direction information and command selections to processor 504 and for controlling cursor movement on display 512. This input device typically has two degrees of freedom in two axes, a first axis (i.e., x) and a second axis (i.e., y), that allows the device to specify positions in a plane.

A computer system 500 can perform the present teachings. Consistent with certain implementations of the present teachings, results can be provided by computer system 500 in response to processor 504 executing one or more sequences of one or more instructions contained in memory 506. Such instructions can be read into memory 506 from another computer-readable medium, such as storage device 510. Execution of the sequences of instructions contained in memory 506 can cause processor 504 to perform the processes described herein. In various embodiments, instructions in the memory can sequence the use of various combinations of logic gates available within the processor to perform the processes describe herein. Alternatively hard-wired circuitry can be used in place of or in combination with software instructions to implement the present teachings. In various embodiments, the hard-wired circuitry can include the necessary logic gates, operated in the necessary sequence to perform the processes described herein. Thus implementations of the present teachings are not limited to any specific combination of hardware circuitry and software.

The term "computer-readable medium" as used herein refers to any media that participates in providing instructions to processor 504 for execution. Such a medium can take many forms, including but not limited to, non-volatile media, volatile media, and transmission media. Examples of non-volatile media can include, but are not limited to, optical or magnetic disks, such as storage device 510. Examples of volatile media can include, but are not limited to, dynamic memory, such as memory 506. Examples of transmission media can include, but are not limited to, coaxial cables, copper wire, and fiber optics, including the wires that comprise bus 502.

Common forms of non-transitory computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, PROM, and EPROM, a FLASH-EPROM, any other memory chip or cartridge, or any other tangible medium from which a computer can read.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

In various embodiments, the methods of the present teachings may be implemented in a software program and applications written in conventional programming languages such as C, C++, G, etc.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

The embodiments described herein, can be practiced with other computer system configurations including hand-held devices, microprocessor systems, microprocessor-based or programmable consumer electronics, minicomputers, mainframe computers and the like. The embodiments can also be practiced in distributing computing environments where tasks are performed by remote processing devices that are linked through a network.

It should also be understood that the embodiments described herein can employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations that form part of the embodiments described herein are useful machine operations. The embodiments, described herein, also relate to a device or an apparatus for performing these operations. The systems and methods described herein can be specially constructed for the required purposes or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

Certain embodiments can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Results

Figure 6:
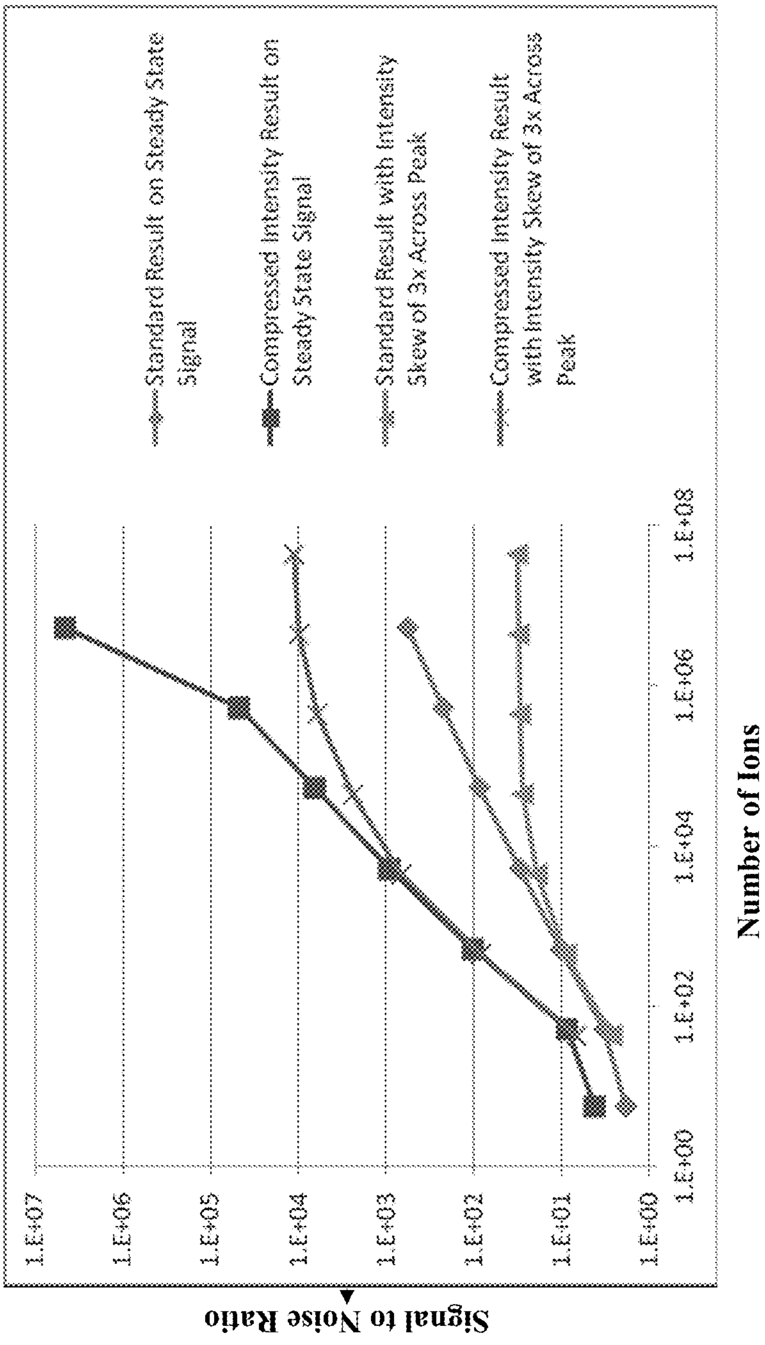
FIG. 6 is a graph illustrating improved signal to noise achieved using the methods described, in accordance with various embodiments.

FIG. 6 illustrates the relationship between the number of ions observed and the signal-to-noise ratio. Comparisons are made between the analysis with and without using intensity compression as described herein. Two data sets are analyzed, one with a steady state signal and the other with a 3× intensity skew across the peak. As is shown in FIG. 6, the presence of the intensity skew negatively impacts the signal-to-noise ratio relative to the steady state signal. When intensity compression is not used, the signal-to-noise ratio maxing out above about $10^4$ ions while the signal-to-noise ratio of the steady state signal continues to increase. Under both conditions (steady state and intensity skew), the signal-to-noise ratio obtained by analyzing the data using intensity compression is significantly higher then when intensity compression is not used.

What is claimed is:

1. A method for analyzing a sample by mass spectrometry, comprising:

producing ions from the sample and delivering the ions to an entrance of a multipole;

applying oscillatory and resolving DC voltages to electrodes of the multipole to cause the multipole to selectively transmit to its distal end ions within a range of mass-to-charge ratios (m/z's) determined by the amplitudes of the oscillatory and resolving DC voltages;

acquiring, at a detector located adjacent to the distal end of the multipole, data representative of the spatial distributions, across a plane oriented orthogonally to a longitudinal axis of the multipole, of ions transmitted by the multipole at a plurality of consecutive time points; and deconvolving the acquired data to produce a mass spectrum, wherein the deconvolving includes processing the data to compress a dynamic range of intensity values in the data.

2. The method of claim 1, further comprising deconvolving the acquired data without compressing a dynamic range of intensity values to determine a relative abundance of ions.

3. The method of claim 1, wherein the processing step includes rescaling the intensity values in accordance with a power function.

4. The method of claim 3, wherein the data are organized into a plurality of voxel planes, and the processing step includes adjusting a parameter of the power function based on a total intensity of each voxel plane.

5. The method of claim 3, wherein the data are organized into a voxel set including a plurality of voxel planes, and the processing step includes adjusting a parameter of the power function based on a total intensity of the voxel set.

6. The method of claim 1, wherein the step of deconvolving the data includes computing cross-products of the processed data with a set of reference signals, the reference signals each being representative of a measured or expected spatial distribution of a single ion species at a particular operating state of the multipole.

7. The method of claim 1, wherein the step of applying oscillatory and resolving DC voltages includes progressively varying at least one of the amplitudes of the oscillatory and resolving DC voltages during a scan period, and wherein the step of acquiring data includes acquiring data a plurality of consecutive time points extending along the scan period.

8. The method of claim 1, wherein the abundance of ions is affected by chromatographic skew.

9. The method of claim 1, wherein the abundance of ions is affected by source instability.

10. A method for analyzing a sample by mass spectrometry, comprising:

providing an analyte to a mass spectrometer, the mass spectrometer including:

a multipole configured to selectively transmit to its distal end ions within a range of mass-to-charge ratios (m/z's) determined by the amplitudes of oscillatory and resolving DC voltages applied to electrodes of the multipole; and a detector located adjacent to the distal end of the multipole acquiring, at the detector, data representative of spatial distributions, across a plane oriented orthogonally to a longitudinal axis of the multipole, of ions transmitted by the multipole at a plurality of consecutive time points; and deconvolving the acquired data to produce a mass spectrum, wherein the deconvolving includes processing the data to compress a dynamic range of intensity values in the data.

11. The method of claim 10, further comprising deconvolving the acquired data a second time without compressing the dynamic range of the intensity values to determine relative abundance of ions.

12. The method of claim 11, wherein deconvolving the second time utilizes the positional information obtained by the first deconvolving step.

13. The method of claim 10, wherein the processing step includes rescaling the intensity values in accordance with a power function.

14. The method of claim 13, wherein the data are organized into a plurality of voxel planes, and the processing step includes adjusting a parameter of the power function based on a total intensity of each voxel plane.

15. The method of claim 13, wherein the data are organized into a voxel set including a plurality of voxel planes, and the processing step includes adjusting a parameter of the power function based on a total intensity of the voxel set.

16. The method of claim 10, wherein the step of deconvolving the data includes computing cross-products of the processed data with a set of reference signals, the reference signals each being representative of a measured or expected spatial distribution of a single ion species at a particular operating state of the multipole.

17. The method of claim 10, wherein the abundance of ions is affected by chromatographic skew.

18. The method of claim 10, wherein the abundance of ions is affected by source instability.

19. A mass spectrometer, comprising:

a multipole comprising a set of electrodes extending between entrance and distal ends;

a voltage controller for applying oscillatory and resolving DC voltages to the set of electrodes, the applied oscillatory and resolving voltages establishing an electric field within the multipole that causes ions within a range of m/z's to be selectively transmitted from the entrance end to the distal end of the multipole, the range of m/z's of the transmitted ions being determined by the amplitudes of the applied oscillatory and resolving DC voltages;

a position-sensitive detector located adjacent to the distal end of the multipole for acquiring data representative of the spatial distributions, across a plane oriented orthogonally to a longitudinal axis of the multipole, of ions transmitted by the multipole at a plurality of consecutive time points; and a processor programmed with instructions to deconvolve the acquired data to produce a mass spectrum, wherein the instructions include processing the data to compress a dynamic range of intensity values in the data.

20. The mass spectrometer of claim 19, wherein the instructions to process the data include instructions to rescale the intensity values in accordance with a power function.

21. The mass spectrometer of claim 20, wherein the data are organized into a plurality of voxel planes, and the instructions to process the data include instructions to adjust a parameter of the power function based on a total intensity of each voxel plane.

22. The mass spectrometer of claim 20, wherein the data are organized into a voxel set including a plurality of voxel planes, and the instructions to process the data include instructions to adjust a parameter of the power function based on a total intensity of the voxel set.

23. The mass spectrometer of claim 19, wherein the instructions to deconvolve the data include instructions to compute cross-products of the processed data with a set of reference signals, the reference signals each being representative of a measured or expected spatial distribution of a single ion species at a particular operating state of the multipole.

24. The mass spectrometer of claim 19, wherein the voltage controller is configured to progressively vary at least one of the amplitudes of the oscillatory and resolving DC voltages during a scan period, and wherein the acquired data includes data from a plurality of consecutive time points extending along the scan period.

25. The mass spectrometer of claim 19, wherein the abundance of ions is affected by chromatographic skew.

26. The mass spectrometer of claim 19, wherein the abundance of ions is affected by source instability.

* * * * *